(12) United States Patent
Ing et al.

(10) Patent No.: US 8,042,004 B2
(45) Date of Patent: Oct. 18, 2011

(54) DIAGNOSING COMMUNICATIONS BETWEEN COMPUTER SYSTEMS

(75) Inventors: Albert Ing, Wappingers Falls, NY (US); Gregory F. Pfister, Austin, TX (US); Patrick Sugrue, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 398 days.

(21) Appl. No.: 12/036,800

(22) Filed: Feb. 25, 2008

(65) Prior Publication Data

US 2009/0217096 A1 Aug. 27, 2009

(51) Int. Cl.
*G06F 11/00* (2006.01)

(52) U.S. Cl. ........................................... 714/43
(58) Field of Classification Search ............. 714/43
See application file for complete search history.

(56) References Cited

U.S. PATENT DOCUMENTS

| | | | |
|---|---|---|---|
| 6,912,604 B1 | 6/2005 | Tzeng et al. | |
| 7,093,024 B2 | 8/2006 | Craddock et al. | |
| 7,116,673 B2 | 10/2006 | Kashyap et al. | |
| 7,145,837 B2 | 12/2006 | Herring et al. | |
| 7,290,077 B2 | 10/2007 | Gregg et al. | |
| 7,343,515 B1 | 3/2008 | Gilbertson et al. | |
| 7,480,840 B2 | 1/2009 | Hathorn et al. | |
| 7,496,045 B2 | 2/2009 | Boyd et al. | |
| 7,555,566 B2 | 6/2009 | Blumrich et al. | |
| 7,675,867 B1* | 3/2010 | Mraz et al. | 370/254 |
| 2003/0005039 A1 | 1/2003 | Craddock et al. | |
| 2003/0016669 A1 | 1/2003 | Pfister et al. | |
| 2003/0031183 A1 | 2/2003 | Kashyap et al. | |
| 2003/0093627 A1 | 5/2003 | Neal et al. | |
| 2004/0022184 A1 | 2/2004 | Van Lieu et al. | |
| 2004/0146006 A1* | 7/2004 | Jackson | 370/230 |
| 2005/0038883 A1 | 2/2005 | Elko et al. | |
| 2006/0031521 A1* | 2/2006 | Wilk | 709/227 |
| 2006/0045089 A1 | 3/2006 | Bacher et al. | |
| 2007/0067678 A1 | 3/2007 | Hosek et al. | |
| 2007/0070975 A1* | 3/2007 | Otani et al. | 370/351 |
| 2009/0204875 A1 | 8/2009 | Burrow et al. | |
| 2009/0217096 A1 | 8/2009 | Ing et al. | |

* cited by examiner

*Primary Examiner* — Scott Baderman
*Assistant Examiner* — Jigar Patel
(74) *Attorney, Agent, or Firm* — Cantor Colburn LLP; Steven Chiu

(57) ABSTRACT

Diagnosing communications between computer systems includes sending a message from a sending node to a receiving node. The receiving node detects an error in the receiving node receiving the message and captures the data regarding the error on the receiving. A diagnostic log request is sent from the receiving node to the sending node, the diagnostic log request including a request for the sending node to log information. The sending node diagnoses the communications error in response to the diagnostic log response.

25 Claims, 6 Drawing Sheets

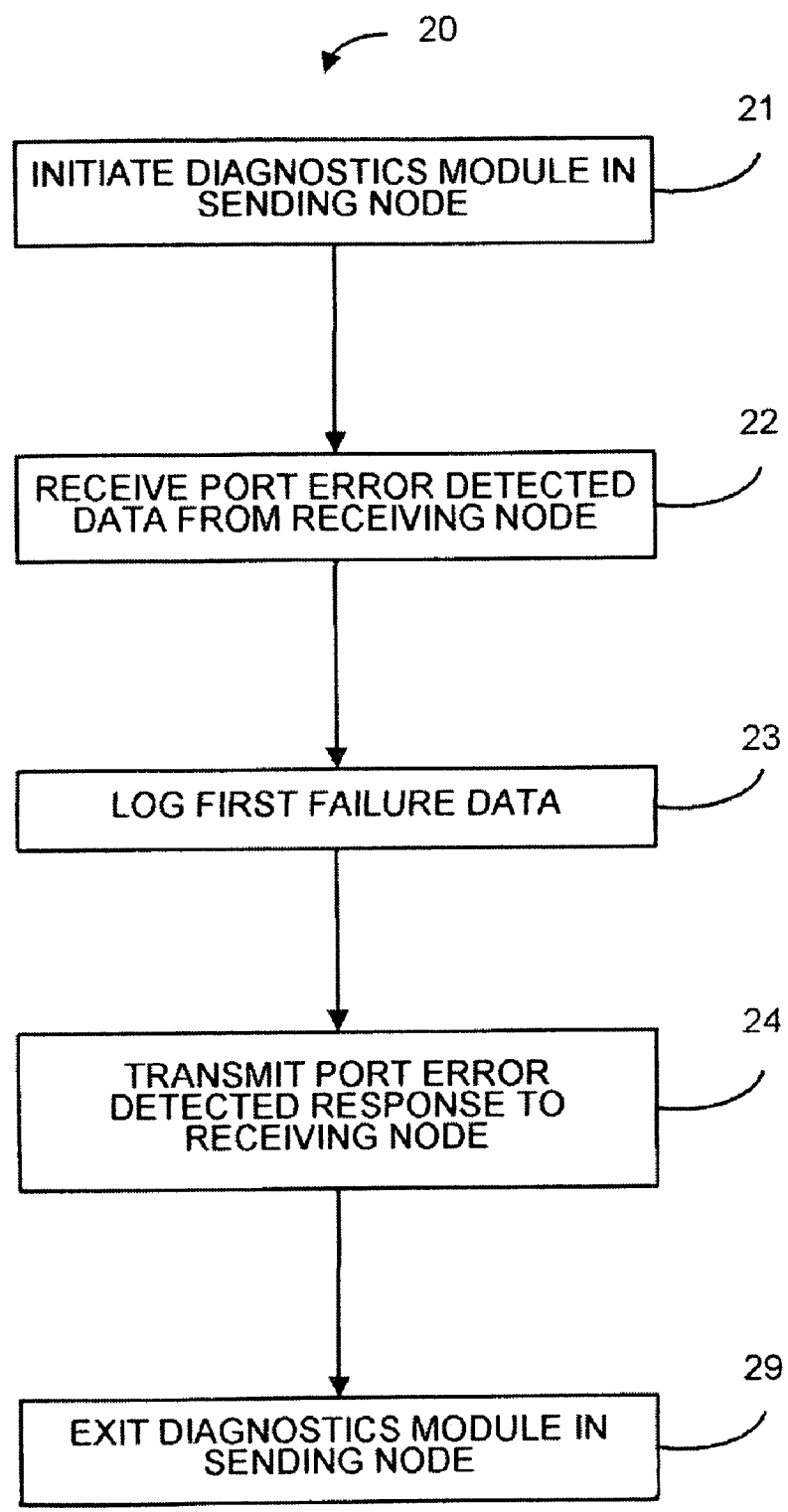

FIG. 5

| MAD FIELD NAME | DESCRIPTION |
|---|---|
| MAD_TYPE | DIAGNOSTIC LOG MAD |
| MAD_MODIFIER | TYPE OF LOG TO BE WRITTEN; TELLS A WHAT TO DO |
| PORT_RECEIVE_ERROR_ENCODE | ARCHITECTED PORT RECEIVED ERROR IN CODES<br>0X20 LOCAL LINK INTEGRITY<br>0X21 EXCESSIVE BUFFER OVERRUNS<br>0X22 LOCAL PHYSICAL ERRORS<br>0X23 MALFORMED DATA PACKET ERRORS<br>0X24 MALFORMED LINK PACKET ERRORS<br>0X25 PACKETS DISCARDED DUE TO BUFFER OVERRUN |
| SPARE [27] | USER-DEFINED SPACE |

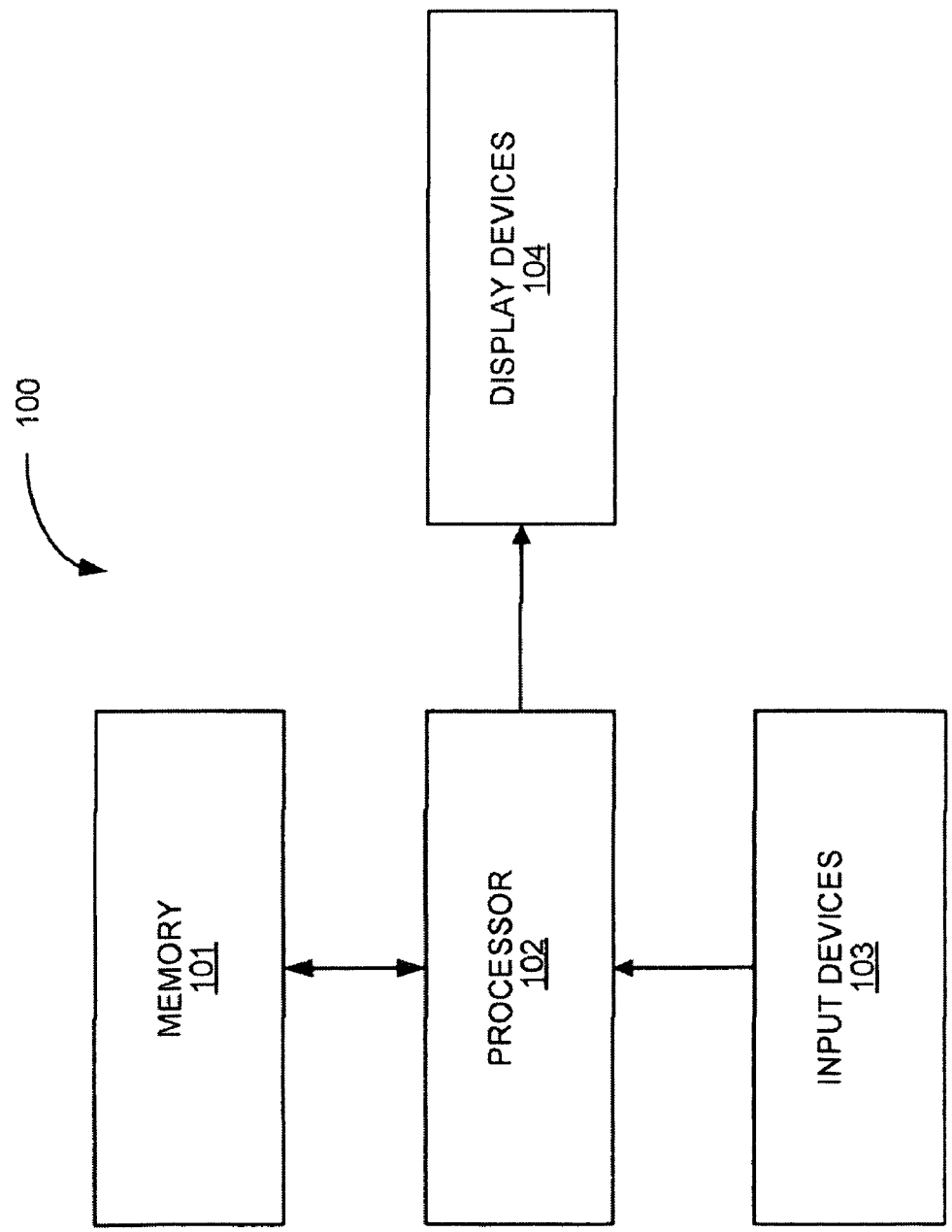

DIAGNOSING COMMUNICATIONS BETWEEN COMPUTER SYSTEMS

BACKGROUND OF THE INVENTION

This invention relates generally to inter-computer communications, and more particularly to diagnosing communications between computer systems.

Diagnosing errors in inter-computer communication links is often difficult because the site where an error is detected is often not where the error is actually occurring. For example, one side of a communication link may send a message to another and expect a reply, but never receive one. The error is likely to be on the other side, but the sending side detects the error.

The situation is often complicated by several factors. One such factor is the difficulty in correlating any log information on both sides of the communication link because separate logs are based on time clocks that are not synchronized. Another factor is that the different sides can be physically distant from one another, from across a room from one another to kilometers apart. In the latter case in particular, the time delay in communication substantially increases the difficulty of correlating error indications on the two sides of the communication link. A root issue, however, is that error detection is on one side of a communication link while the error cause is on the other.

In addition, cases are regularly encountered which are not adequately anticipated and covered by the responses and diagnostics preprogrammed or built into the communications system. Exemplary situations that typically cause problems include a silent (e.g., unlogged) drop of a message by the recipient node for reasons unknown, a message received with header information that is incorrect or unanticipated, and a message exchange sequence that exhibits unanticipated delays or hangs. Often such under-anticipated events will elicit standard responses, such as logging of status or error information, but, in practice, this has turned out to not always be enough.

It would be desirable to be able to improve the diagnosis of communication errors between nodes.

BRIEF SUMMARY OF THE INVENTION

Embodiments of the present invention provide a method, system and computer program product for diagnosing communications between computer systems.

All exemplary embodiment includes a method for diagnosing communications including sending a message from a sending node to a receiving node. The receiving node detecting at the receiving node an error in the receiving node in receiving tile message, and capturing data regarding the error on the receiving node. The receiving node sending a diagnostic log request from the sending node to the receiving node. The diagnostic log request including a request for the sending node to log information; and diagnosing the communications error in response to the diagnostic log response.

Another exemplary embodiment includes a system for diagnosing communications. Briefly described, in architecture, one embodiment of the system, among others, can be implemented as follows. The system includes a sending node in communication with a receiving node over a communication link. The sending node sends a message to a receiving node. The receiving node detects an error in the receiving node in receiving the message and captures data regarding the error on the receiving node. The receiving node sends a diagnostic log request to the sending node, the diagnostic log request including a request for the sending node to log information. The sending node receives a diagnostic log response from the receiving node, the diagnostic log response including the logged information. The sending node diagnoses the communications error in response to the diagnostic log response.

A further exemplary embodiment includes a computer program product for diagnosing communications, the computer program product comprising a computer-readable storage medium for storing instructions for diagnosing communications. The diagnosing communications comprising a method of sending a message from a sending node to a receiving node. The receiving node detecting at the receiving node an error in the receiving node in receiving the message, and capturing data regarding the error on the receiving node. The receiving node sending a diagnostic log request from the sending node to the receiving node. The diagnostic log request including a request for the sending node to log information; and diagnosing the communications error in response to the diagnostic log response.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 4 is a flow chart illustrating the operation of an exemplary embodiment of the diagnostics module in the sending node according to the principles of the present invention, as shown in FIGS. 1 and 2.

FIG. 5 illustrates fields used in a diagnostic log message in exemplary embodiments.

FIG. 6 illustrates a computer apparatus, according to an example embodiment.

DETAILED DESCRIPTION OF EXEMPLARY EMBODIMENTS

An exemplary embodiment of the present invention provides a diagnostic message that one computer system can send to the other upon detection of an error and requesting that the diagnostic information be logged. The message includes information specifying the type of information to be logged and/or the type of error encountered and information identifying the error as seen on the receiving node. The information contains sufficient data to correlate the log entry on the receiving node with corresponding data at the sending node.

The present invention is based on two things. First, the fact that common high-performance communications links are physically duplexed. There are, in effect, two separate bundled physical links in each cable, one used for transmission in one direction, and the other used in the other direction. Second, it is often observed in practice that there are errors in only one direction, or the error is less than total, or even intermittent and therefore usually very difficult to diagnose. For these reasons, despite the error, data can still be transmitted, perhaps with abnormal amounts of error recovery needed. In this situation, the computer system detecting the error (call it B) can still send data to another computer system (call it A), and computer system A may still be able to send data to computer system B.

The invention consists of procedures and facilities causing computer system B (which detected the error) to send to computer system A, a message containing information identifying the error (e.g., a coding of the error's type and other diagnostic data depending on the type) along with a time stamp indicating when the error happened according to computer system B's clock. This data can be placed in a lo, on the computer system A side. Computer system A will also put this information in its own error log. In addition, if possible, computer system A can send a response back to computer system B. identifying when computer system A saw the message from computer system B and when, according to computer system A's clock, which computer system B can also log to use to diagnose the error.

The result of these actions is that as much information as possible about the error is available on both sides of the link, greatly enhancing the ability of diagnostic tools and mechanisms to perform more accurate diagnosis and more quickly isolate the root cause of the error.

Figure 1:
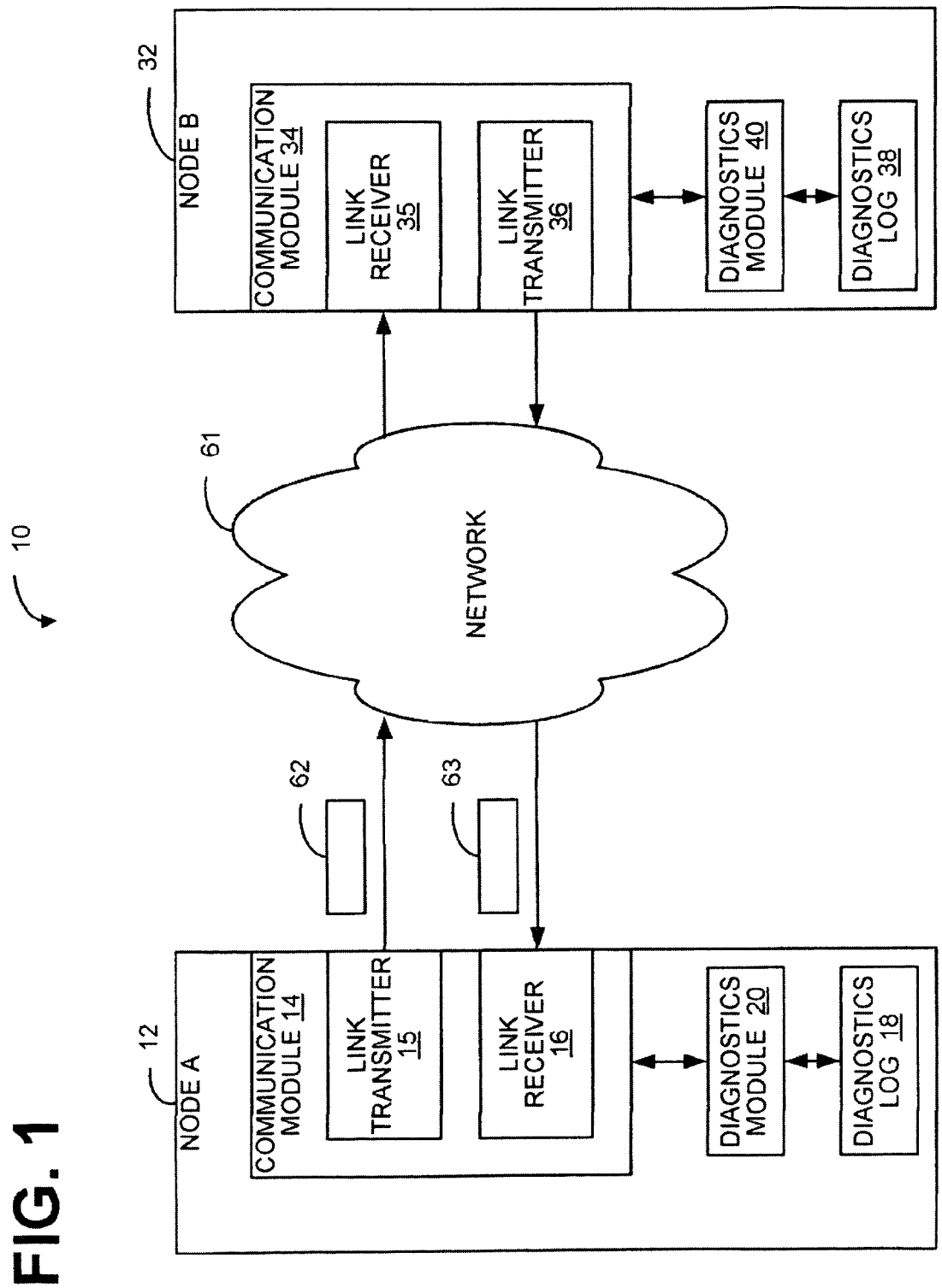
FIG. 1 is a block diagram of a system for diagnosing communications in an exemplary embodiment.

FIG. 1 is a block diagram of a system 10 for diagnosing communications in an exemplary embodiment. First node 12 and second node 32 may be implemented using a variety of processor-enabled devices such as for example, but not limited to: mainframes, PCs, workstations, laptops, handheld computer, pocket PCs, PDAS, pagers, WAP devices, non-WAP devices, cell phones, palm devices and the like. As illustrated, nodes 12 and 32 are data processing systems (i.e. processing circuits) suitable for storing and/or executing program code and will include at least one processor coupled directly or indirectly to memory elements through a system bus.

The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system 10 directly or through intervening I/O controllers. Finally, the I/O devices may further include devices that communicate both inputs and outputs, for instance but not limited to: a link transmitter/receiver, a NIC or modulator/demodulator for accessing remote devices, other files, devices, systems, or a network; a radio frequency (RF) or other transceiver; a telephonic interface; bridge, router or the like.

Both first node 12 and second node 32 include communication modules 14 and 34, respectively, that handle the sending and receiving of messages over network 61. The communication modules 14 and 34 may be implemented in software and/or hardware. When the communication modules 14 and 34 are implemented in software, it should be noted that the communication modules 14 and 34 can be stored on virtually any computer readable medium for use by or in connection with any computer related system or method. In the context of this document, a computer readable medium is an electronic, magnetic, optical, or other physical device or means that can contain or store a computer program for use by or in connection with a computer related system or method. As illustrated in FIG. 1, communication modules 14 and 34 utilize link transmitters 15 and 36 and link receivers 16 and 35 coupled to the nodes 12 and 32 to enable the nodes to become coupled to each other, other data processing systems, remote printers or storage devices through intervening private or public networks.

A first node 12 is in communication with a second node 32 over a network 61. It is understood that both node 12 and node 32 can send and receive communications and implement the processes described herein. Node 12 is referred to as the sending node and node 32 is referred to as the receiving node for ease of describing processes occurring when node 12 sends a message to node 32.

Network 61 may be an internal network such as a local area network (LAN) within an organization, an external network, or a combination of both and may have other physical machines or devices (not shown) coupled to it. In an exemplary embodiment, communications modules 14 and 34 support an INFINIBAND architecture with network 61 being an INFINIBAND link. It is understood that other communication protocols may be used, and embodiments are not limited to INFINIBAND applications. The INFINIBAND architecture is described in the InfiniBand standard, which is hereby incorporated by reference.

The diagnostic logs 18 and 38 store diagnostic log events described in further detail herein. The diagnostic log event instructs nodes 12 and 32 of the types of data that should be logged in order to diagnose communication errors. In the exemplary embodiment of the present invention, the receiving node 32 creates the error log and then sends a diagnostic log event to the sending node 12. The sending node 12 creates an error log and then sends a diagnostic log response back to the receiving node 32.

The diagnostic logs 18 and 38 may be implemented in software and/or hardware. When the diagnostic logs 18 and 38 are implemented in software, it should be noted that the diagnostic logs 18 and 38 can be stored on virtually any computer readable medium for use by or in connection with any computer related system or method. More examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

The diagnostic modules 20 and 40 may be implemented in software and/or hardware. When the diagnostic modules 20 and 40 are implemented in software, it should be noted that the diagnostic modules 20 and 40 can be stored on virtually any computer readable medium for use by or in connection with any computer related system or method. The diagnostic module 40 in the receiving node 32 uses locally generated message information (e.g., type of message, time of message, etc.) along with information in the diagnostic log event to diagnose a communication error, and then sends that information to the sending node 12. The diagnostic module 20 in the sending node 12 uses message information (e.g., type of message, time of message, etc.) log a communication error, and then sends a response to the receiving node 32.

In the event that a communication error arises, data can still be transmitted from the sending node 12 to the receiving node 32. In exemplary embodiment, the communications network 61 is physically duplexed. Communication network 61 includes two separate bundled physical links, one used for transmission in one direction, and the other used for reception in the other direction. It is often observed that there are errors only in one direction. Further, the error is often less than total communications failure, but rather is intermittent and, therefore, very difficult to diagnose. For these reasons, despite the error, data can still be transmitted. In this situation, receiving node 32 detecting the error can still send data to sending node 12, and vice versa.

Figure 2:
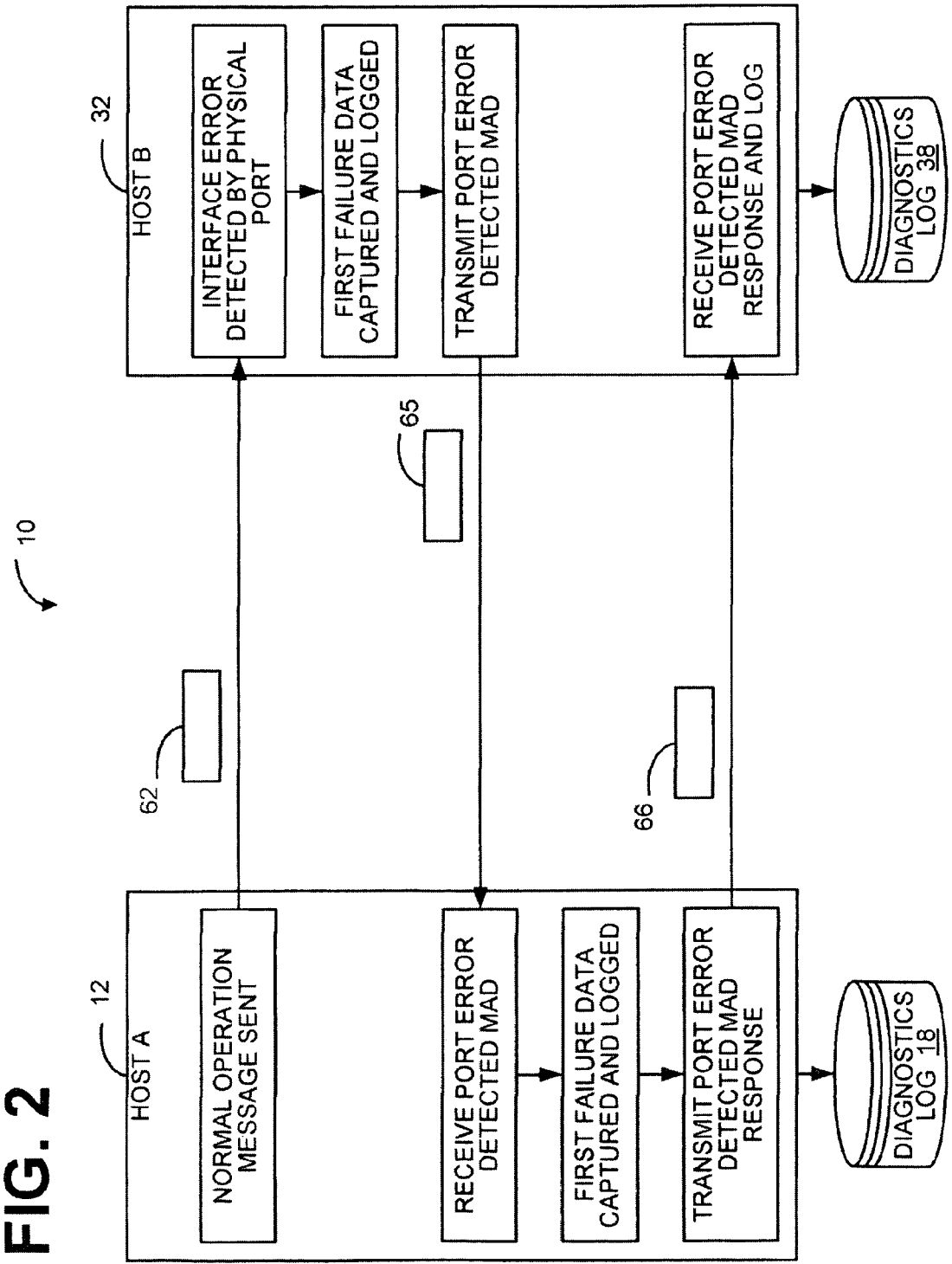
FIG. 2 is a block diagram illustrating signal flow between two nodes in an exemplary embodiment.
Figure 3:
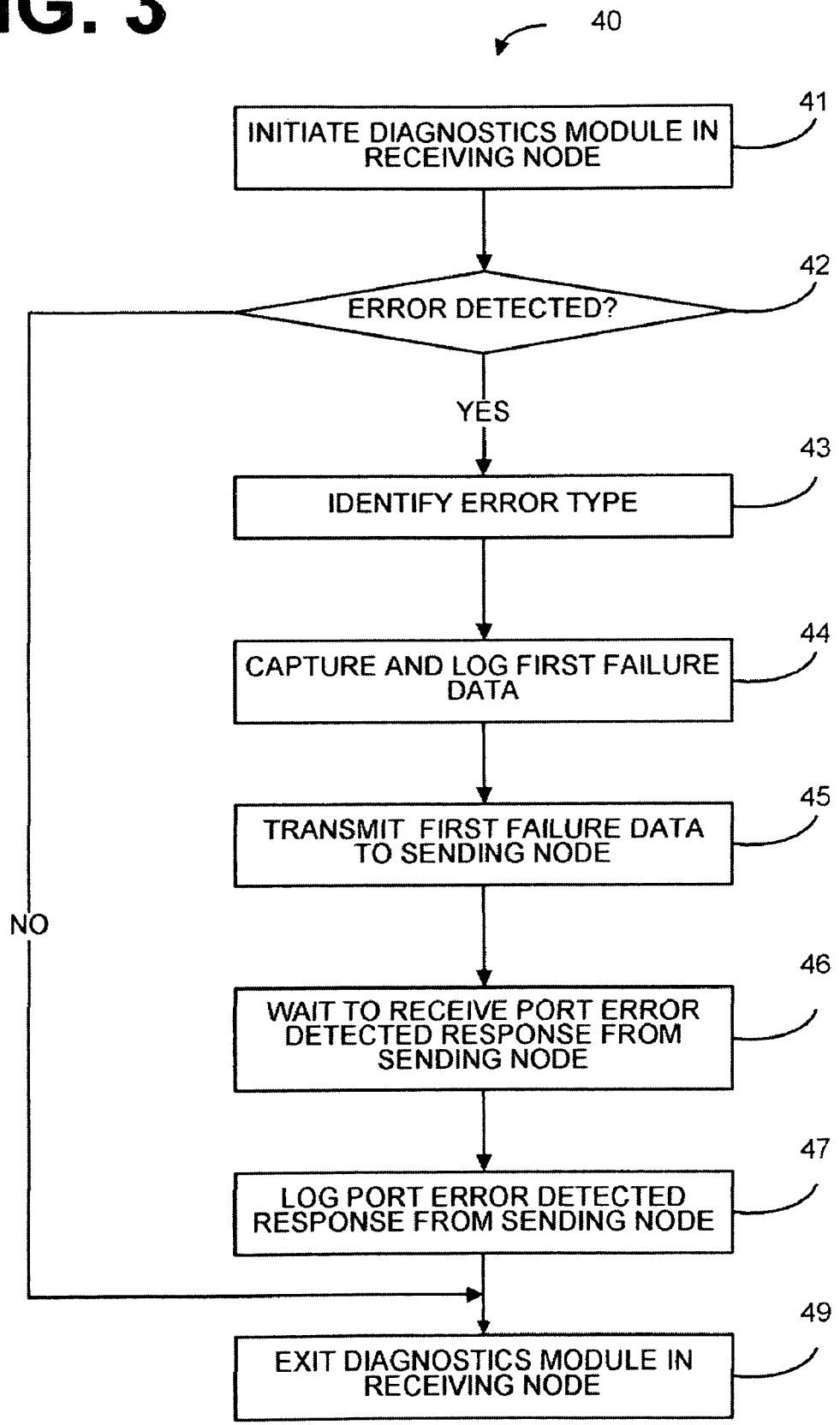
FIG. 3 is a flow chart illustrating the operation of an exemplary embodiment of the diagnostics module in the receiving node according to the principles of the present invention, as shown in FIGS. 1 and 2.

FIGS. 2-4 illustrate examples of messaging between sending node 12 and receiving node 32. In the exemplary embodiment of the present invention, the receiving node 32 detects an interface error, creates the error log and then sends a diagnostic log response to the sending node 12.

As described further below, upon detecting an error the receiving node 32 determine the type of failure (i.e. an interface error), captures the failure data and logs it in diagnostic log 38, and sends a diagnostic log message to sending node 12. The diagnostic log message contains information identifying the type of diagnostic information appropriate to the error, along with information identifying both the message and the error's characteristics as seen by receiving node 32. On receipt of the diagnostic log message, the sending node 12 logs specified failure data along with identifying information from receiving node 32. The diagnostic log 18 may be in the form of writing an error log entry, hardened on static storage or not.

Sending node 12 or receiving node 32 may send a diagnostic log message automatically, as part of its response to detecting the error. Alternatively, either sending node 12 or receiving node 32 may send the diagnostic log message at the command of a system administrator. The latter is particularly useful in situations where what is going wrong is completely unclear, particularly if the message specifies that sending node 12 or receiving node 32 log to storage a typical circular buffer of log messages, saving it from being overwritten.

Given the identifying information from sending node 12 or receiving node 32, diagnostic modules 20 and 40 execute diagnostic procedures to correlate the data captured on sending node 12 or receiving node 32 in the diagnostic log response with information from receiving node 32 or sending node 12 about how the error is manifest, greatly simplifying the task of uncovering the root cause of the error.

FIG. 2 illustrates signal flow between two nodes in an exemplary scenario where the receiving node 32 detects an interface error on an interface port (i.e. link transmitter 36 or link receiver 35). An interface error can be caused, for example, but not limited to, by a defective port transmitter, port receiver or a cable connecting the physical ports. In InfiniBand architecture port errors include, but are not limited to: local link integrity, excessive buffer overruns, local physical errors (i.e. cyclic redundancy check (CRC)), malformed data packet errors (i.e., errors in data packet header fields such as version number, virtual lane, etc.), malformed link packet errors (i.e. errors in link-level packet data such as length of the packet), and packets discarded due to buffer overrun.

As shown in FIG. 2, the receiving node 32 detects an interface error when trying to receive the originating message 62 from sending node 12. The receiving node 32 captures the first failure data and logs that in diagnostic log 38. The first failure data includes, but is not limited to, links status, contents of registers and system control blocks. Receiving node 32 then transmits a diagnostic log message 65 indicating a port error has occurred to the sending node 12.

The sending node 12 receives a diagnostic log message from the receiving node 32. In response, sending node 12 creates an error entry and stores the error entry in a diagnostic log 18. The sending node 12 then sends a diagnostic log message 66 to the receiving node 32 including the error entry and response so that the receiving node.32 can log the error entry and response of sending node 12 in diagnostic log 38.

FIG. 3 is a flow chart illustrating the operation of an exemplary embodiment of the diagnostics module 40 in the receiving node 32 according to the principles of the present invention, as shown in FIGS. 1 and 2.

First at step 41, the diagnostics module 40 is initialized. This initialization includes the startup routines and processes embedded in the BIOS of the receiving node 32. The initialization also includes the establishment of data values for particular data structures utilized in the diagnostics module 40.

Next, the receiving node 32 determines at step 42 if it detects an error with the communication module 34 interfaces (i.e. link receiver 35 or link transmitter 36). If an error is not detected at step 42, the diagnostics module 40 then skips to exit 49.

However, upon detecting an error at step 42 the receiving node 32 determines the type of failure (i.e. an interface error) at step 43. At step 44, the failure data is captured and log in diagnostic lot 38. The first failure data may include, but is not limited to, link status and the contents of registers and system control blocks. The diagnostic log message contains information identifying the type of diagnostic information appropriate to the error, along with information identifying both the message and the error's characteristics as seen by receiving node 32.

At step 45, the diagnostics module 40 sends a diagnostic log response including the error log to the sending node 12 so that the sending node can diagnose the message failure in consideration of information logged at the receiving node 32. At step 46, the diagnostics module 40 waits to receive a port error detected response from the sending node 12. Upon receiving a response from sending node 12 or after a timeout period has been exceeded, the diagnostics module 40 then exits at step 49.

FIG. 4 is a flow chart illustrating the operation of an exemplary embodiment of the diagnostics module 20 in the sending node 12 according to the principles of the present invention, as shown in FIGS. 1 and 2.

First at step 21, the diagnostics module 20 is initialized. This initialization includes the startup routines and processes embedded in the BIOS of the receiving node 12. The initialization also includes the establishment of data values for particular data structures utilized in the diagnostics module 20.

The sending node 12 receives the diagnostic log message at step 22. At step 23, the sending- node 12 logs specified failure data along with identifying information from receiving node 32 in diagnostic log 18. The diagnostic log 18 may be in the form of writing an error log entry, hardened on static storage or not.

At step 24, the sending node 12 may send a diagnostic log message back to the receiving node 32 as part of its response to receiving the notice of the error. Alternatively, either sending node 12 or receiving node 32 may send the diagnostic log message at the command of a system administrator. The latter is particularly useful in situations where what is going wrong is completely unclear, particularly if the message specifies that sending node 12 or receiving node 32 log to storage a typical circular buffer of log messages, saving it from being overwritten.

Given the identifying information from receiving node 32, diagnostic module 20 executes diagnostic procedures to correlate the data captured from receiving, node 32 in the diagnostic log response with information about how the error is manifest, greatly simplifying the task of uncovering the root cause of the error.

Upon sending a response from sending node 12 or after a timeout period has been exceeded, the diagnostics module 20 then exits at step 29.

FIG. 5 illustrates the diagnostic log request in exemplary embodiments. The diagnostic log request is in the form of a management datagram having a number of fields. The first field, mad_type, identifies the management datagram as a diagnostic log request. The second field, mad_modifier, instructs the sending node 12 and receiving node 32 as to the type of log to be written. An exemplary mad_modfier type is a diagnostic log IB trace instruction causing 64K of circular trace data to be logged and written to disk at the receiving node 32. This instruction captures the trace data to avoid having the circular buffer overwritten. Another exemplary mad_modfier type is a diagnostic log instruction. This causes the receiving node 32 to generate a log to be logged and written to disk as determined by the log_type field. This may involve sending node 12 or receiving node 32 logging the contents of registers and system control blocks, such as QP control blocks, system error control blocks, etc.

The third field, port_receive_error_encode, specifies a code that indicates the type of the error being encountered. The remaining is reserved for specific vendor implementation. In alternative embodiments, other types of fields may be included, such as but not limited to, a local log count field to serve as an identifier for a diagnostic log request, a local adapter ID field identifies the adapter where the error was manifest.

Technical effects and benefits of embodiments include the ability to diagnose message failures by forcing a receiving node to log information as specified by the sending node. This information is then returned to the sending node to Facilitate diagnosis of the message error using data from both the sending node and the receiving node.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It is further noted that embodiments of the invention may be embodied in the form of computer-implemented processes and apparatuses for practicing those processes. Therefore, according to an exemplary embodiment, the methodologies described hereinbefore may be implemented by a computer system or apparatus. For example, FIG. 6 illustrates a computer apparatus, according to an exemplary embodiment. Therefore, portions or the entirety of the methodologies described herein may be executed as instructions in a processor 102 of the computer system 100. The computer system 100 includes memory 101 for storage of instructions and information, input device(s) 103 for computer communication, and display device 104. Thus, the present invention may be implemented, in software, for example, as any suitable computer program on a computer system somewhat similar to computer system 100. For example, a program in accordance with the present invention may be a computer program product causing a computer to execute the example methods described herein.

The computer program product may include a computer-readable medium having computer program logic or code portions embodied thereon for enabling a processor (e.g., 102) of a computer apparatus (e.g., 100) to perform one or more functions in accordance with one or more of the example methodologies described above. The computer program logic may thus cause the processor to perform one or more of the. example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

Further, such programs, when recorded on computer-readable storage media, may be readily stored and distributed. The storage medium, as it is read by a computer, may enable the method(s) disclosed herein, in accordance with an exemplary embodiment of the present invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments filling within the scope of the appended claims. Moreover, the use of the terms first, second, etc. do not denote any order or importance, but rather the terms first, second, etc. are used to distinguish one element from another.

The invention claimed is:

1. A method for diagnosing communications, the method comprising:

receiving a first message from a sending node at a receiving node;

detecting at the receiving node an error in receiving the first message;

determining by the receiving node that the error is an interface error;

capturing data regarding the interface error on the receiving node;

creating a first error log about the interface error at the receiving node;

sending a diagnostic log request as a second message from the receiving node to the sending node, the diagnostic log request as the second message including a request for the sending node to log information about the interface error detected at the receiving node;

wherein the diagnostic log request as the second message sent from the receiving node causes the sending node to create a sending node error entry to be stored on the sending node; and receiving from the sending node a diagnostic log response as a third message at the receiving node in response to the diagnostic log, the diagnostic log response as the third message including the sending node error entry that was created and stored by the sending node;

wherein each of the first message from the sending node, the second message being the diagnostic log request sent by the receiving node, and the third message being the diagnostic log response from the sending node are different messages from one another.

2. The method of claim 1 wherein the diagnostic log request is a management datagram having a number of fields, a first field identifying the management datagram as the diagnostic log request; and wherein a type of the interface error comprises a defective port transmitter, a defective port receiver, and a defective cable connecting physical ports.

3. The method of claim 2 wherein: the diagnostic log request includes a second field identifying the type of log to be written by the sending node.

4. The method of claim 3 wherein: the second field identifies a trace of data.

5. The method of claim 3 wherein: the second field identifies contents of registers and system control blocks.

6. The method of claim 3 wherein: the diagnostic log request includes a third field identifying an error experienced at the receiving node.

7. The method of claim 6 wherein the third field, further comprises: identifying a port receive error.

8. The method of claim 2 wherein: the diagnostic log request includes a field identifying an adapter on the receiving node where the error was manifest.

9. A system for diagnosing communications, the system comprising:
a communication link; and
a sending node in communication with a receiving node over the communication link;
the sending node sends a first message to a receiving node;
the receiving node detects an error in the receiving node in receiving the first message;
the receiving node determines that the error is an interface error;
the receiving node captures data regarding the interface error on the receiving node;
the receiving node creates a first error log about the interface error at the receiving node;
the receiving node sends a diagnostic log request as a second message to the sending node, the diagnostic log request as the second message including a request for the sending node to log information about the interface error detected at the receiving node;
wherein the diagnostic log request as the second message sent from the receiving node causes the sending node to create a sending node error entry to be stored on the sending node;
the receiving node receives from the sending node a diagnostic log response as a third message at the receiving node, the diagnostic log as the third message including the sending node error entry that was created and stored by the sending node; and
the sending node diagnoses the interface error in response to the diagnostic log request;

wherein each of the first message from the sending node, the second message being the diagnostic log request sent by the receiving node, and the third message being the diagnostic log response from the sending node are different messages from one another.

10. The system of claim 9 wherein: the diagnostic log request is a management datagram having a number of fields, a first field identifying the management datagram as the diagnostic log request.

11. The system of claim 9 wherein: the diagnostic log request includes a second field identifying the type of log to be written by the sending node.

12. The system of claim 11 wherein: the second field identifies a trace of data.

13. The system of claim 11 wherein: the second field identifies contents of registers and system control blocks.

14. The system of claim 11 wherein: the diagnostic log request includes a third field identifying an error experienced at the receiving node.

15. The system of claim 14 wherein the third field, further comprises: identifying a port receive error.

16. The system of claim 11 wherein: the diagnostic log request includes a field identifying the adapter on the receiving node where the error was manifest.

17. A computer program product for diagnosing communications, the computer program product comprising:
a storage medium readable by a processing circuit and storing instructions for execution by the processing circuit for performing a method comprising:
receiving a first message from a sending node at a receiving node;
detecting at the receiving node an error in the receiving node in receiving the first message;
determining by the receiving node that the error is an interface error;
capturing data regarding the interface error on the receiving node;
creating a first error log about the interface error at the receiving node;
sending a diagnostic log request as a second message from the receiving node to the sending node, the diagnostic log request as the second message including a request for the sending node to log information about the interface error detected at the receiving node;
wherein the diagnostic log request as the second message sent from the receiving node causes the sending node to create a sending node error entry to be stored on the sending node; and
receiving from the sending node a diagnostic log response as a third message at the receiving node, the diagnostic log response as the third message including the sending node error entry that was created and stored by the sending node;
wherein each of the first message from the sending node, the second message being the diagnostic log request sent by the receiving node, and the third message being the diagnostic log response from the sending node are different messages from one another.

18. The computer program product of claim 17 wherein: the diagnostic log request is a management datagram having a number of fields, a first field identifying the management datagram as the diagnostic log request.

19. The computer program product of claim 18 wherein: the diagnostic log request includes a second field identifying the type of log to be written by the sending node.

20. The computer program product of claim 19 wherein: the second field identifies a circular trace of data.

21. The computer program product of claim 19 wherein: the second field identifies contents of registers and system control blocks.

22. The computer program product of claim 18 wherein: the diagnostic log request includes a third field identifying a logging routine to be called at the sending node.

23. The computer program product of claim 18 wherein: the diagnostic log request includes a third field identifying an error experienced at the receiving node.

24. The computer program product of claim 23 wherein the third field, further comprises: identifying a port receive error.

25. The computer program product of claim 18 wherein: the diagnostic log request includes a field identifying an adapter on the receiving node where the error was manifest.

\* \* \* \* \*